United States Patent
Chen

(10) Patent No.: US 6,454,330 B1
(45) Date of Patent: Sep. 24, 2002

(54) REPLACEABLE HEAD FOR AN EXTENSION TOOL

(76) Inventor: Wen-Chun Chen, No. 16, Lane 26, Fu-Cheng Rd., Fu-Hsing Hsiang, Changhua Hsien (TW)

( * ) Notice: Subject to any disclaimer, the term of this patent is extended or adjusted under 35 U.S.C. 154(b) by 0 days.

(21) Appl. No.: 10/034,946

(22) Filed: Dec. 28, 2001

(51) Int. Cl.[7] ................................................. B25J 1/02
(52) U.S. Cl. ...................................... 294/19.1; 294/104
(58) Field of Search ............................ 294/11, 19.1, 22, 294/23, 24, 50.8, 50.9, 104, 115, 116; 30/194

(56) References Cited

U.S. PATENT DOCUMENTS

| | | | | |
|---|---|---|---|---|
| 304,669 A | * | 9/1884 | Robie | 294/22 |
| 1,024,991 A | * | 4/1912 | Hunt | 294/22 |
| 3,265,429 A | * | 8/1966 | Shatt | 294/19.1 |
| 3,844,599 A | * | 10/1974 | Burian | 294/19.1 |
| 4,483,562 A | * | 11/1984 | Schoolman | 294/19.1 |
| 5,192,104 A | * | 3/1993 | Lin | 294/19.1 |
| 5,590,923 A | * | 1/1997 | Berger et al. | 294/19.1 |

* cited by examiner

*Primary Examiner*—Johnny D. Cherry
(74) *Attorney, Agent, or Firm*—Thorp Reed & Armstrong LLP

(57) ABSTRACT

A Placeable extension tool in this invention is composed of a tool connector (10), a tool head (20), a trigger block (30) and an actuating device (40). The trigger block (30) is a driving element pivotally secured inside the tool connector (10) to control the movement of the tool head (20) but not inseparable with the tool head (20). Thereby, the tool head (20) can be quickly and easily replaced to increase the versatility of the extension tool.

11 Claims, 6 Drawing Sheets

REPLACEABLE HEAD FOR AN EXTENSION TOOL

BACKGROUND OF THE INVENTION

1. Field of the Invention

The present invention relates to a replaceable head for an extension tool, and more particularly to a replaceable head for an extension tool that can be changed rapidly and easily to increase the versatility of the extension tool.

2. Description of Related Art

With reference to FIGS. 5 and 6, a conventional extension tool such as a litter picker is composed of an actuating set (60) and a clamp head (70).

The actuating set (60) consists of a tube (62) and a handle (64) attached to one end of the tube (62), wherein a trigger (66) is mounted on the handle (64).

The clamp head (70) is secured on the other end of the tube (62) and is composed of an upper jaw (72) and a lower jaw (74). The upper jaw (72) is firmly attached to the tube (62), and the lower jaw (74) is pivotally attached to the upper jaw (72).

A control wire (68) passes through the tube (62), and one end is attached to the trigger (66). The control wire (68) curves around the upper periphery of the lower jaw (74), and the other end of the control wire (68) is attached to the lower jaw (74). Therefore, when the litter picker operates, the trigger (66) is squeezed to pull the wire (68) whereby the lower jaw (74) is pivotally activated to close with the upper jaw (72) to pick up objects such as litter.

However, the conventional extension tool has a drawback. Because the control wire (68) is securely attached to the actuating set (60) and the clamp head (70) to activate the lower jaw (74), the clamp head (70) cannot be separated from the actuating set (60). Therefore, the extension tool is limited to a single application.

To allow the extension tool to have multiple capabilities, the present invention has arisen to mitigate and/or obviate the disadvantage of the conventional extension tool.

SUMMARY OF THE INVENTION

The main objective of the present invention is to provide a replaceable head for an extension tool, which can be changed easily and rapidly.

Further benefits and advantages of the present invention will become apparent after a careful reading of the detailed description with appropriate reference to the accompanying drawings.

DETAILED DESCRIPTION OF THE INVENTION

Figure 1:
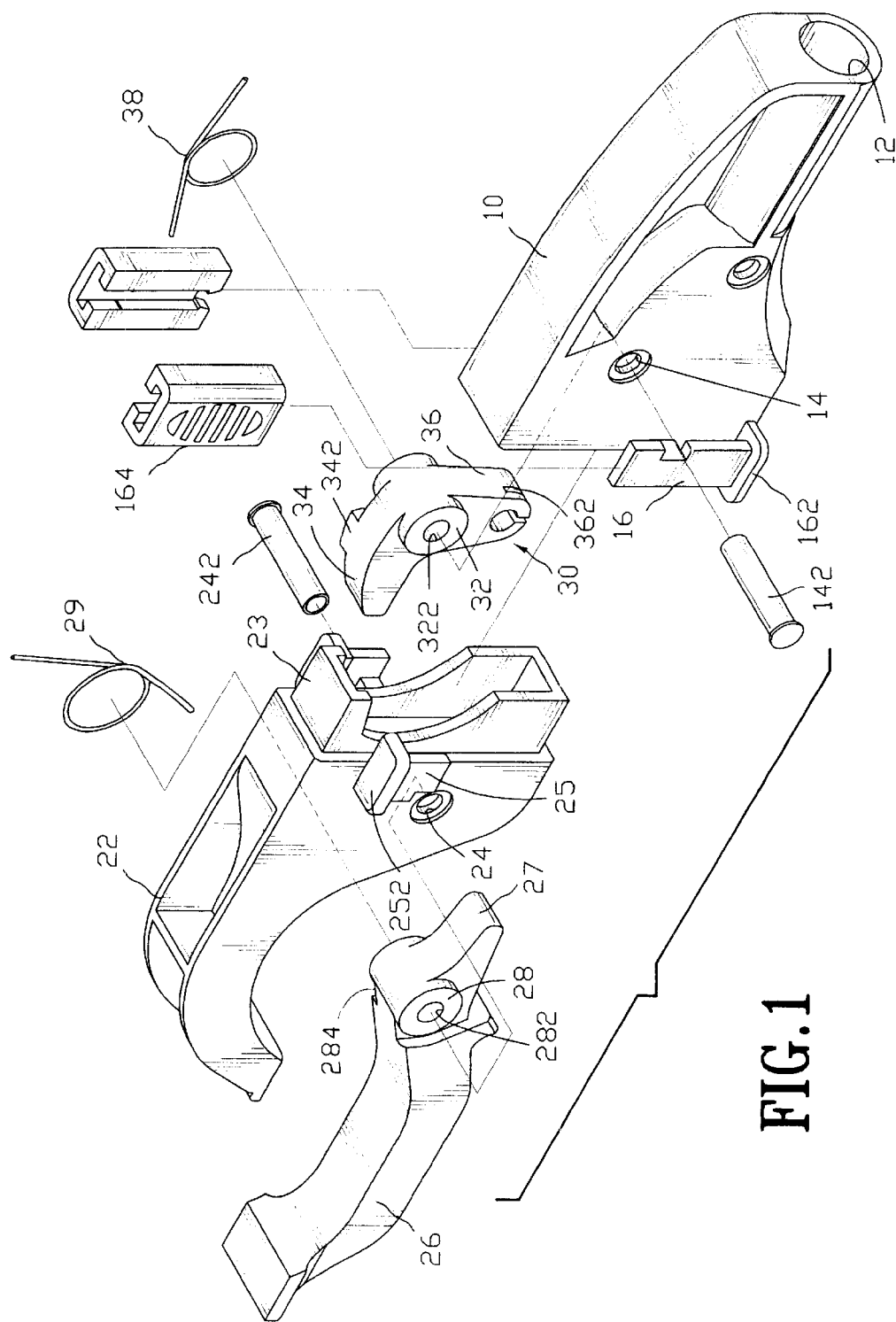
FIG. 1 is an exploded perspective view of a replaceable head for an extension tool in accordance with the present invention.
Figure 2:
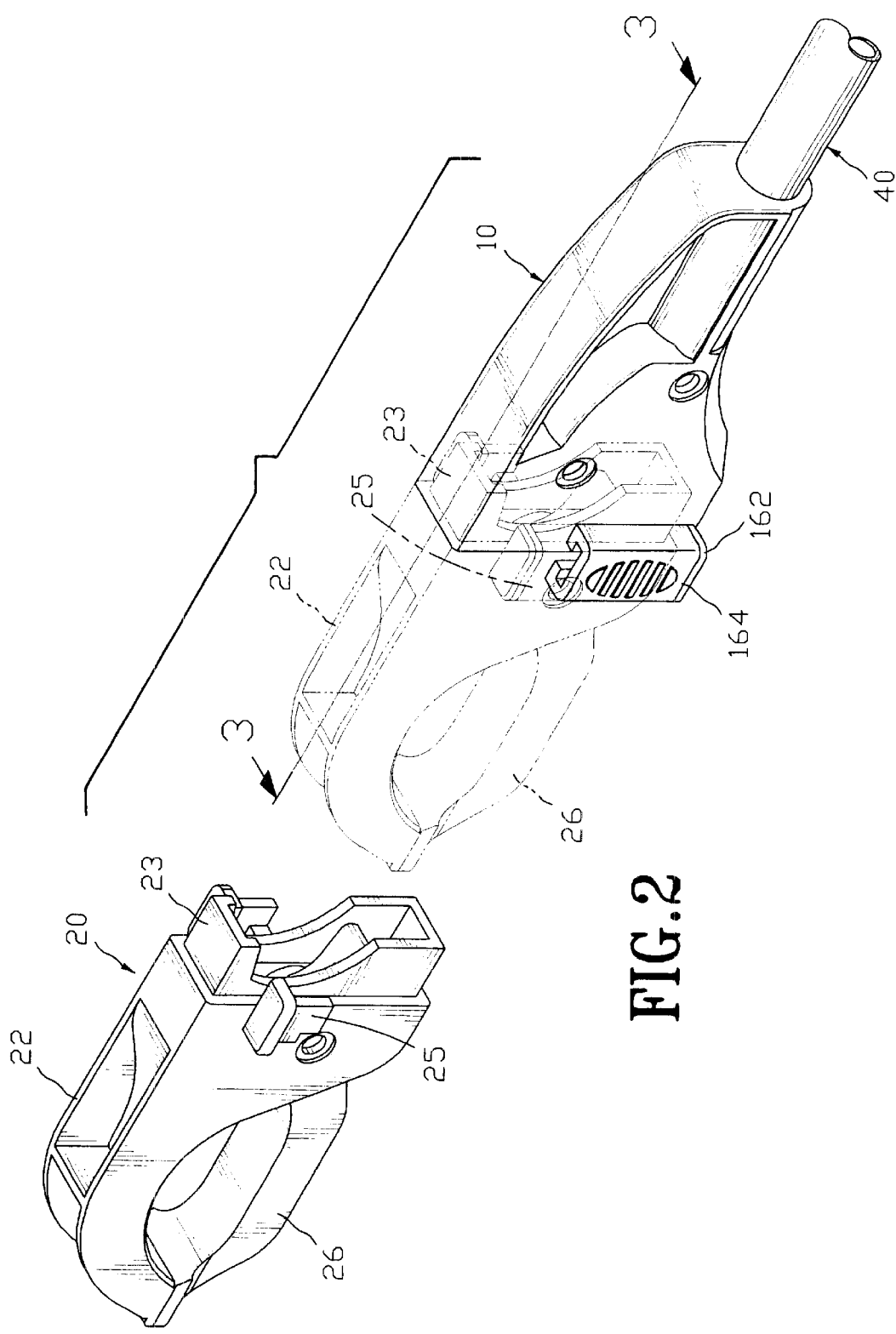
FIG. 2 is a perspective view of the replaceable head for an extension tool in FIG. 1.
Figure 3:
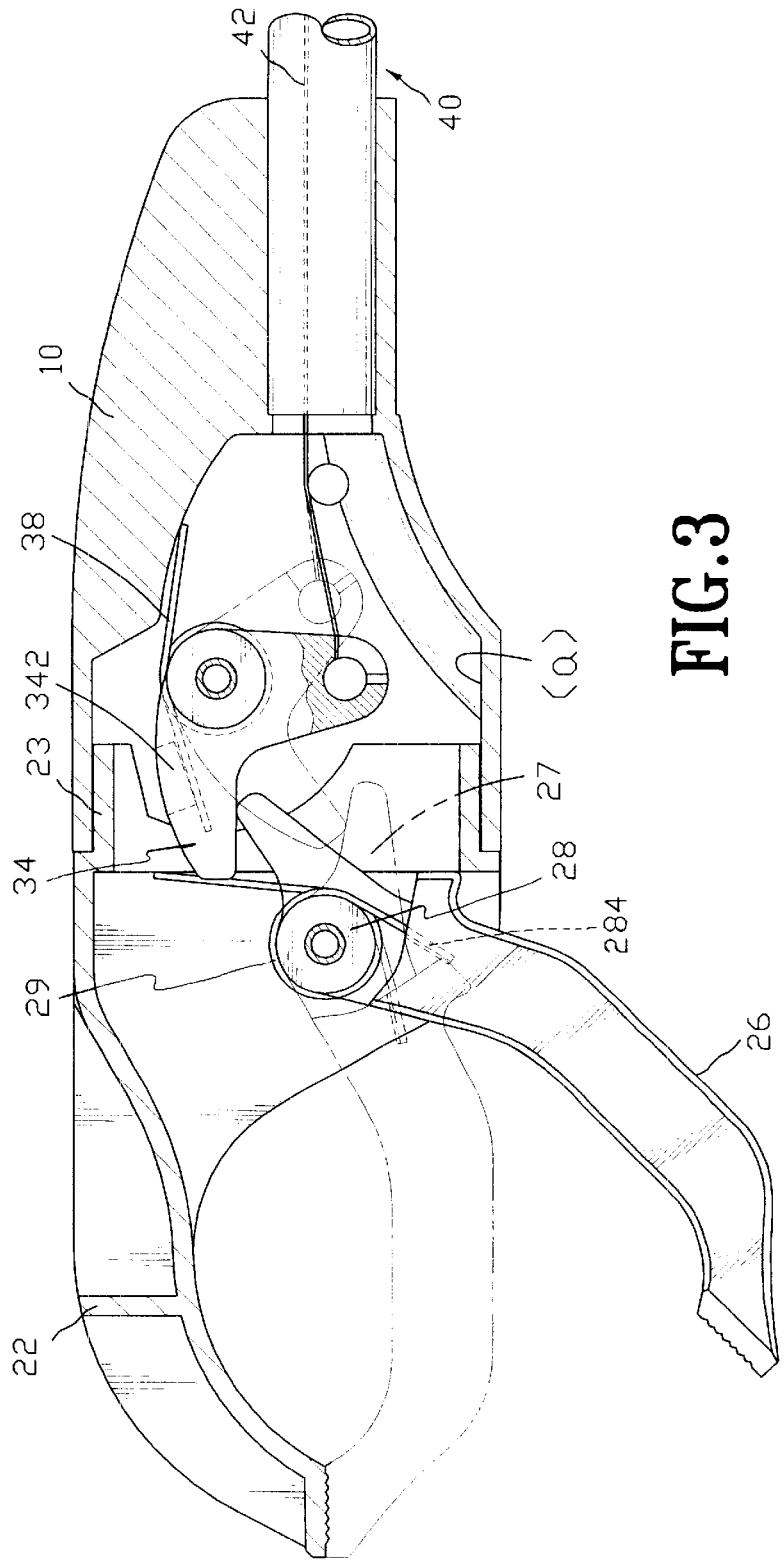
FIG. 3 is a cross-sectional side plan view of the replaceable head for an extension tool along line 3—3 in FIG. 2.

With reference to FIGS. 1, 2 and 3, a replaceable head for an extension tool in accordance with the present invention comprises a tool connector (10), a tool head (20), a trigger block (30) and an actuating device (40). The actuating device (40) is the same as an actuating set (60) in a conventional extension tool.

The tool connector (10) has a rod hole (12) defined in a first end to receive a tube (42) and connect to the actuating device (40). A recess (a) is defined in a second end of the tool connector (10), and a pair of aligned first pivot holes (14) is defined in two opposite walls of the tool connector (10) to communicate with the recess (a). Additionally, a lower locking strip (16) is attached on each side face of the second end of the tool connector (10), and a lower stopper (162) is secured below the lower locking strip (16). Moreover, a C-shaped cap (164) resiliently slides on each lower locking strip (16).

The tool head (20) is composed of a first arm (22) and a second arm (26) pivotally attached to the first arm (22). A longitudinal flange (23) is formed on an enlarged portion of the first arm (22) which extends toward the tool connector (10) to be received inside the recess (a). A hollow channel (not numbered) is defined in the enlarged portion of the first arm (22), and a pair of second pivot holes (24) is defined in two opposite walls of the enlarged portion to communicate with the hollow channel. An upper locking strip (25) is attached to each side face of the first arm (22) to correspond to the lower locking strip (16), and an upper stopper (252) is secured above the upper locking strip (25). A tongue (27) is formed on a first end of the second arm (26). A first stub (28) is formed in a middle portion of the second arm (26) and has a first through hole (282) defined in the first stub (28). A groove (284) is defined near the first stub (28) in a side face of the second arm (26). A second pivot pin (242) penetrates the second pivot holes (24) and the first through hole (282) to pivotally attach the second arm (26) to the first arm (22). Additionally, a first resilient coil (29) is mounted around the first stub (28) and has one end secured in the groove (284) in the second arm (26) and the other end secured on an inner protruding portion (not shown) of the first arm (22).

The trigger block (30) is substantially L-shaped and pivotally mounted inside the recess (a) of the tool connector (10). The trigger block (30) comprises a contact lever (34), an actuating lever (36), a second stub (32) and a second resilient coil (38). The contact lever (34) and the actuating lever (36) are essentially perpendicular and are formed around the second stub (32). A second through hole (322) is defined in the second stub (32). The second through hole (322) is aligned with the first pivot holes (14) and all holes (322, 14) are penetrated by a first pivot pin (142) so that the trigger block (30) is pivotally secured inside the recess (a) in the tool connector (10). The contact lever (34) extends toward the tool head (20) and has a lip (342) formed on one side of the contact lever (34). A wire connector (362) is defined in a distal end of the actuating lever (36) to attach the wire from the actuating device (40). The second resilient coil (38) is mounted around the second stub (32) and has one end secured on the tool connector (10) and the other end pressing against the lip (342) of the trigger block (30).

With reference to FIG. 2, before attaching the tool head (20) to the tool connector (10), the trigger block (30) is already mounted inside the tool connector (10) and the second arm (26) is pivotally connected to the first arm (22). First, the longitudinal flange (23) on the tool head (20) is inserted into the recess (a) in the tool connector (10). When the longitudinal flange (23) is fully inserted, the contact lever (34) on the trigger block (30) touches the tongue (27) on the second arm (26), and the upper locking strip (25) on the first arm (22) aligns with the lower locking strip (16) on the tool connector (10). Then, the C-shaped cap (164) is pushed upwardly to engage and hold the upper and lower locking strips (16, 25) together to firmly hold the tool head (20) on the tool connector. Additionally, other locking devices such as a buckle or tenon-mortise means can be substituted for the fixing strips (16, 25) and C-shaped cap (164).

With reference to FIG. 3, when the extension tool operates, the wire (42) in the actuating device (40) pulls the actuating lever (36) causing it to pivot upward. Therefore, the contact lever (34) is pivoted downward to push the tongue (27) downward so that the second arm (26) pivots toward the first arm (22), whereby the tool head (20) is driven to clamp objects.

When the second arm (26) moves toward the first arm (22), the first resilient coil (29) is torqued and stores a restitution force. Therefore, when the wire (42) is released, the second arm (26) returns to the original position and the arms (22, 26) are opened. In the same way, the second resilient coil (38) stores a restitution force when the trigger block (30) is pivoted. Therefore, when the wire (42) is released, the second resilient coil (38) returns the trigger block (30) to the original position and releases the pressure on the second arm (26).

Figure 4:
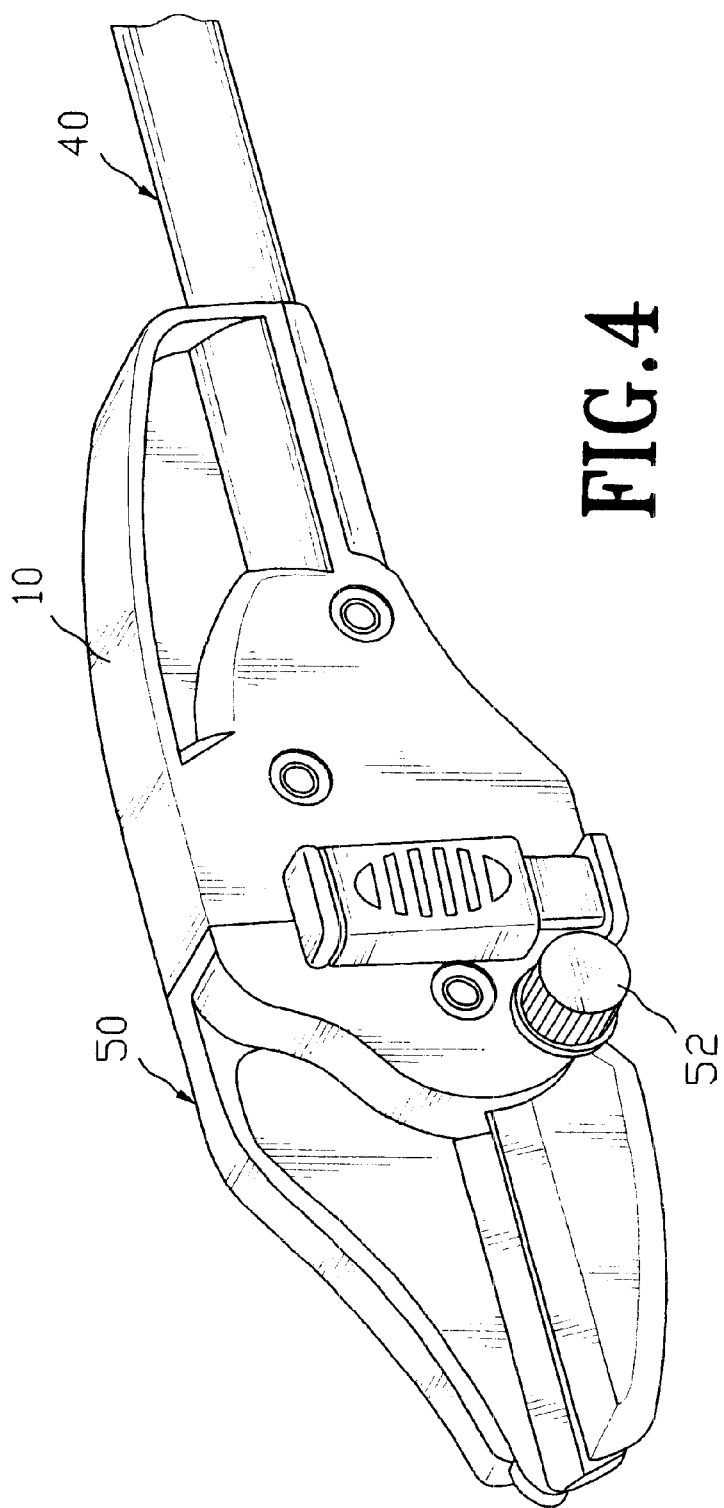
FIG. 4 is a perspective view of another embodiment of the replaceable extension tool having shears.
Figure 5:
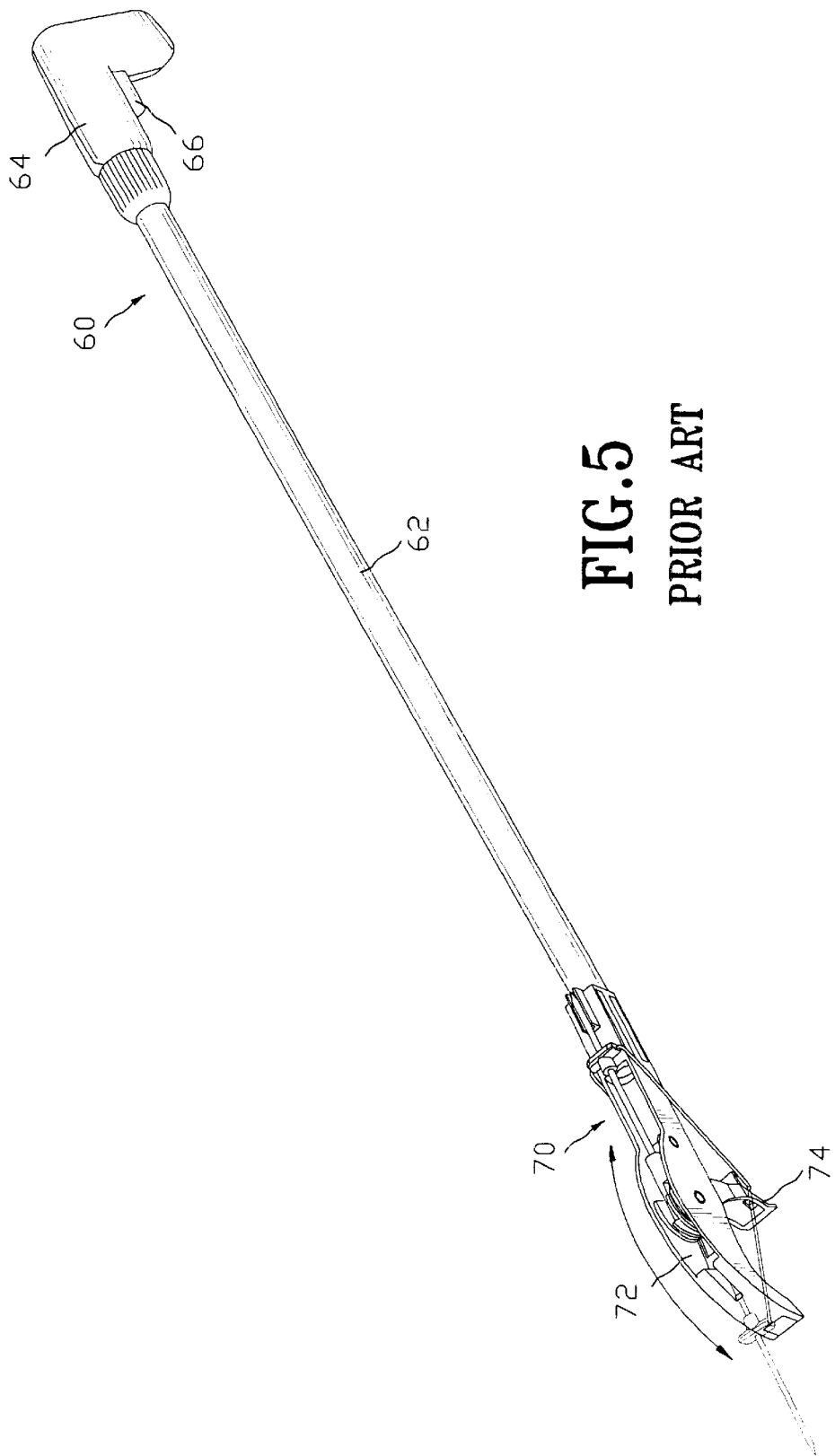
FIG. 5 is a perspective view of a conventional extension tool.
Figure 6:
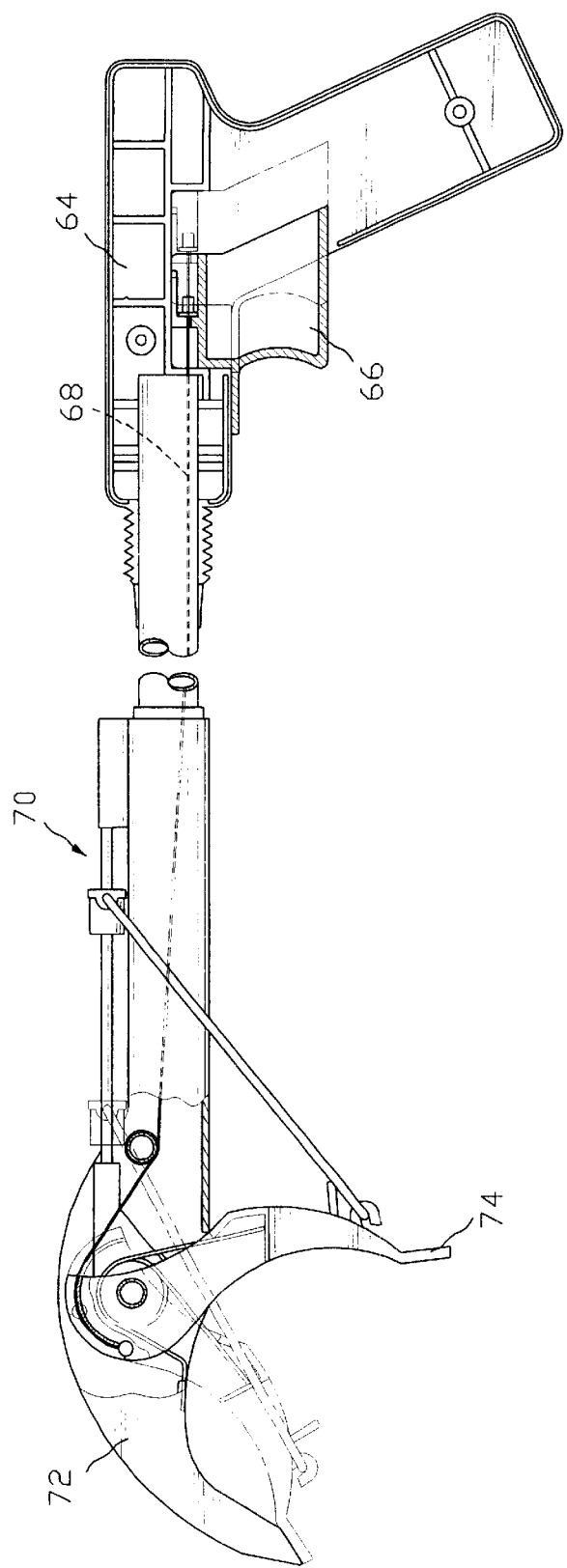
FIG. 6 is a cross-sectional plan side view of the conventional extension tool.

With reference to FIG. 4, because the trigger block (30) and the second arm (26) are individual pieces, the tool head (20) is detachable from the tool connector (10). Therefore, the tool head (20) can be changed to different types such as shears. Because of the sharp inner blades of the shears head (50), a safety pin (52) is used to lock the blades closed when the extension tool is not in use.

Although the invention has been explained in relation to its preferred embodiment, it is to be understood that many other possible modifications and variations can be made without departing from the spirit and scope of the invention as hereinafter claimed.

What is claimed is:

1. A replaceable head for an extension tool comprising:
    a tool connector (10) having a recess (a) defined in the tool connector (10);
    a tool head (20) detachably attached to the tool connector (10) and having
        a first arm (22) having a longitudinal flange (23) formed on the first arm (22) toward the tool connector (10) to be received inside the recess (a) of the tool connector (10);
        a second arm (26) pivotally attached to the first arm (22) and having a tongue (27) formed on the second arm (26); and
        a first resilient coil (29) secured on the tool head (20) to provide a restitution force to open the arms (22, 26);
    a trigger block (30) pivotally mounted inside the recess (a) of the tool connector (10) and having
        contact lever (34) formed on one end of the trigger block (30) to contact and drive the tongue (27) of the second arm (26);
        an actuating lever (36) perpendicular to the contact lever (34) formed on the other end of the trigger block (30); and
        a second resilient coil (38) mounted on the trigger block (30) to provide a restitution force to the trigger block (30); and
    an actuating device (40) connected to the tool connector (10) and connected to the actuating lever (36) of the trigger block (30) to actuate the tool head (20).

2. The replaceable head for an extension tool as claimed in claim 1, wherein the second arm (26) has a first stub (28) to retain the first resilient coil (29) and the trigger block (30) has a second stub (32) to retain the second resilient coil (38).

3. The replaceable head for an extension tool as claimed in claim 2, wherein the second arm (26) has a groove (284) defined in the second arm (26); and
    the first, resilient coil (29) has one end retained in the groove (284) of the second arm (26) and the other end secured on the first arm (22).

4. The replaceable head for an extension tool as claimed in claim 2, wherein the trigger block (30) has a lip (342) formed on one side of the contact lever (34); and
    the second resilient coil (38) has one end pressed against the lip (342) of the contact lever (34) and the other end secured on the tool connector (10).

5. The replaceable head for an extension tool as claimed in claim 1, wherein the replaceable head for the extension tool further has a locking device mounted thereon to lock the tool connector (10) and the tool head (20) together.

6. The replaceable head for an extension tool as claimed in claim 5, wherein the locking device has:
    at least one lower locking strip (16) attached on a side face of the tool connector (10);
    at least one upper locking strip (25) attached on a side face of the first arm (22) of the tool head (20) to correspond to the lower locking strip (16); and
    a C-shaped cap (164) adjusted to resiliently slide on the lower and upper locking strips (16).

7. The replaceable head for an extension tool as claimed in claim 1, wherein the actuating device (40) has:
    a tube (62) attached to the tool connector (10) at one end;
    a handle (64) attached on the other end of the tube (62);
    a trigger (66) mounted on the handle (64); and
    a wire (68) extending inside the tube (62) and secured between the trigger block (30) and the trigger (66) such that the trigger (66) is squeezed to actuate the tool head (20) via the wire (68).

8. The replaceable head for an extension tool as claimed in claim 6, wherein the actuating device (40) has:
    a tube (62) attached to the tool connector (10) at one end;
    a handle (64) attached on the other end of the tube (62);
    a trigger (66) mounted on the handle (64); and
    a wire (68) extending inside the tube (62) and secured between the trigger block (30) and the trigger (66) such that the trigger (66) is squeezed to actuate the tool head (20) via the wire (68).

9. The replaceable head for an extension tool as claimed in claim 1, wherein the tool head (20) is a clamp.

10. The replaceable head for an extension tool as claimed in claim 1, wherein the tool head (50) is shears.

11. The replaceable head for an extension tool as claimed in claim 10, wherein the shears further has a safety pin (52) secured thereon.

* * * * *